US010200644B2

United States Patent
Do et al.

(10) Patent No.: US 10,200,644 B2
(45) Date of Patent: Feb. 5, 2019

(54) GLOBAL SHUTTER SCHEME THAT REDUCES THE EFFECTS OF DARK CURRENT

(71) Applicant: BAE Systems Imaging Solutions Inc., San Jose, CA (US)

(72) Inventors: Hung T. Do, San Jose, CA (US); Paul G. Lim, Fremont, CA (US); Stephen W. Mims, San Diego, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 31 days.

(21) Appl. No.: 15/552,426

(22) PCT Filed: Dec. 19, 2016

(86) PCT No.: PCT/US2016/067618
§ 371 (c)(1),
(2) Date: Aug. 21, 2017

(87) PCT Pub. No.: WO2018/118016
PCT Pub. Date: Jun. 28, 2018

(65) Prior Publication Data
US 2018/0332247 A1    Nov. 15, 2018

(51) Int. Cl.
*H04N 3/14* (2006.01)
*H04N 5/335* (2011.01)
(Continued)

(52) U.S. Cl.
CPC ........... *H04N 5/3745* (2013.01); *H04N 5/351* (2013.01); *H04N 5/353* (2013.01); *H04N 5/359* (2013.01);
(Continued)

(58) Field of Classification Search
CPC ...... H04N 5/359; H04N 5/3559; H04N 5/353; H04N 5/378; H04N 5/37452; H04N 5/374;
(Continued)

(56) References Cited

U.S. PATENT DOCUMENTS 6,731,335 B1   5/2004  Kim et al.
7,619,671 B2 * 11/2009  Li ........................ H04N 5/3575
                                                          348/301
(Continued)

FOREIGN PATENT DOCUMENTS

WO   2016014860   1/2016

OTHER PUBLICATIONS

International Search Report, PCT/US2016/067618, dated Mar. 10, 2017, 13 pages.

*Primary Examiner* — Chia Wei A Chen
(74) *Attorney, Agent, or Firm* — Calvin B. Ward; Scott J. Asmus

(57) ABSTRACT

An imaging array having a plurality of pixel sensors connected to a bit line is disclosed. Each pixel sensor includes a first photodetector having a photodiode, a floating diffusion node, and an amplifier. The floating diffusion node is characterized by a parasitic photodiode and parasitic capacitance. The amplifier amplifies a voltage on the floating diffusion node to produce a signal on an amplifier output. The first photodetector also includes a bit line gate that connects the amplifier output to the bit line in response to a row select signal and a voltage dividing capacitor having a first terminal connected to the floating diffusion node and a second terminal connected to a drive source that switches a voltage on the second terminal between a drive potential different from ground and ground in response to a drive control signal.

12 Claims, 8 Drawing Sheets

(51) Int. Cl.
*H04N 5/3745* (2011.01)
*H04N 5/351* (2011.01)
*H04N 5/355* (2011.01)
*H04N 5/361* (2011.01)
*H04N 5/353* (2011.01)
*H04N 5/359* (2011.01)
*H04N 5/378* (2011.01)

(52) U.S. Cl.
CPC ........... *H04N 5/3559* (2013.01); *H04N 5/361* (2013.01); *H04N 5/378* (2013.01); *H04N 5/37452* (2013.01)

(58) Field of Classification Search
CPC ............................ H04N 5/351; H04N 5/3745; H01L 27/14609; H01L 27/14603; H01L 27/14643; G09G 2310/0264
USPC .................................................. 348/301–324
See application file for complete search history.

(56) References Cited

U.S. PATENT DOCUMENTS

| | | | |
|---|---|---|---|
| 9,374,545 B2* | 6/2016 | Fowler | H03F 3/16 |
| 9,812,474 B2* | 11/2017 | Yagi | H01L 27/14609 |
| 2001/0012070 A1* | 8/2001 | Enod | H04N 5/32 348/302 |
| 2002/0066848 A1* | 6/2002 | Fowler | H04N 5/361 250/208.1 |
| 2009/0108176 A1 | 4/2009 | Blanquart | |
| 2015/0008307 A1 | 1/2015 | Fowler | |
| 2015/0122974 A1 | 5/2015 | Fowler | |
| 2015/0156413 A1 | 6/2015 | Do et al. | |
| 2015/0350584 A1* | 12/2015 | Fenigstein | H04N 5/355 250/208.1 |
| 2016/0309106 A1* | 10/2016 | Zuo | H04N 5/378 |
| 2016/0316162 A1* | 10/2016 | Kobayashi | H01L 27/14634 |
| 2018/0124337 A1* | 5/2018 | Kim | H04N 5/3698 |
| 2018/0124338 A1* | 5/2018 | Augusto | H04N 5/35563 |
| 2018/0220094 A1* | 8/2018 | Yang | H04N 5/378 |
| 2018/0308426 A1* | 10/2018 | Han | H01L 27/3262 |

* cited by examiner

GLOBAL SHUTTER SCHEME THAT REDUCES THE EFFECTS OF DARK CURRENT

CROSS REFERENCE TO RELATED APPLICATION

This application is a US National Phase Application filed under 35 USC 371 of PCT Application No. PCT/US2016/067618 filed Dec. 19, 2016, and is herein incorporated by reference in its entirety for all purposes.

BACKGROUND

Cameras based on CMOS image sensors typically use an electronic shutter to set the exposure time, rather than the mechanical shutter used on film cameras. The camera includes a lens system that images the scene of interest onto an image sensor that includes an array of pixel sensors that are arranged as a plurality of columns and rows. Each pixel sensor includes a photodiode that integrates the light received by that photodiode for a period of time that will be referred to as the exposure time. The exposure time for any given pixel sensor is the time between its two successive resets of the photodiode in the pixel sensor. That is, the sensor is first reset by emptying the photodiode included in the pixel sensor. After the exposure time elapses, the charge accumulated by the photodiode is again removed by transferring the charge to a storage node in the pixel sensor and the photodiode is then isolated from the storage node. The charge at the storage node is then readout. The readout is performed one row at a time.

There are two predominant shutter schemes, referred to as rolling shutter and global shutter. In a rolling shutter scheme, each row is readout, reset, and then starts collecting charge for the next image. The readout proceeds to the next row, and so on. When the processor that controls the imaging sensor returns to the previously reset row, that row will have been collecting charge for the exposure time. That row will then be readout and the procedure repeated. In this scheme, each row is treated equally in the sense that charge that is transferred to the storage node sits on that node for the same period of time as charge that is transferred to every other storage node, and hence, artifacts that result from the charge being stored for different lengths of time are avoided. However, rolling shutter schemes suffer from motion artifacts when the scene being photographed changes over the time needed to cycle through all of the rows.

To minimize such motion artifacts, global shutter schemes are used; however, these schemes also have undesirable artifacts. In a global shutter scheme, each pixel sensor is reset at the same time at the start of the exposure, and the charge accumulated in each photodiode is transferred to the storage node at the same time at the end of the exposure. The rows are then readout one row at a time. Hence, charge stored in any given row is resident on storage nodes associated with pixel sensors on that row for different periods of time that depend on the row's position in the readout sequence. The storage nodes include a parasitic photodiode that is characterized by a dark current that varies from pixel sensor to pixel sensor. The storage nodes integrate this dark current from the time the storage node is reset until it is read out again, typically a frame time. The long storage dines result in additional charge being added to the storage nodes. The additional charge depends on the temperature-dependent dark current in each pixel sensor in that array. The dark current varies from pixel sensor to pixel sensor in a manner that cannot be predicted from calibration studies of the individual arrays after fabrication, and hence, cannot he corrected. In addition, charge stored on the storage node leaks off (he storage node via tunneling mechanisms. Accordingly, improvements in global shutter systems that reduce these artifacts are needed.

SUMMARY

The present invention includes an imaging array having a plurality of pixel sensors connected to a bit line. Each pixel sensor includes a first photodetector having a photodiode, a floating diffusion node, and an amplifier. The floating diffusion node is characterized by a parasitic photodiode and parasitic capacitance. The amplifier amplifies a voltage on the floating diffusion node to produce a signal on an amplifier output. The first photodetector also includes a bit line gate that connects the amplifier output to the bit line in response to a row select signal and a voltage dividing capacitor having a first terminal connected to the floating diffusion node and a second terminal connected to a drive source that switches a voltage on the second terminal between a drive potential different from ground and ground in response to a drive control signal. The first photodetector also includes a reset gate that connects the floating diffusion node to a first reset voltage source in response to a reset signal, and a first transfer gate that connects the photodiode to the floating diffusion node in response to a first transfer signal.

In one aspect of the invention each pixel sensor also includes a second transfer gate that connects the photodiode to a second reset source in response to a second transfer signal.

In another aspect of the invention, the amplifier includes a source follower having a gate connected to the floating diffusion node.

In another aspect of the invention, the source follower is characterized by a drain terminal and wherein the imaging array also includes a switching circuit that switches the drain terminal from a power rail to ground when the second terminal of the drive voltage dividing capacitor is at ground.

In another aspect of the invention, the imaging array also includes an imaging array controller that generates the row select signal, the drive control signal, the reset signal, and the first transfer gate signal. The imaging array controller generates the drive control signal such that the second terminal is at ground and the amplifier output is not connected to the bit line in response to the row select signal.

In another aspect of the invention, the imaging array controller generates the drive control signal such that the second terminal is at the drive potential when the reset signal causes the floating diffusion node to be connected to the first reset source. In another aspect of the invention, the imaging array controller generates the drive control signal such that the second terminal is at the drive potential when the first transfer signal causes the floating diffusion node to be connected to the photodiode.

In another aspect of the invention, the imaging array also includes a column processing circuit connected to the bit line. The column processing circuit includes a first switch that connects the bit line to a first sample and hold capacitor in response to a first switch control signal to generate a first sample and hold voltage, and a second switch that connects the bit line to a second sample and hold capacitor in response to a second switch control signal to generate a second sample and hold voltage; and a column processor that generates a pixel value includes a difference of the first and second sample and hold voltages. The imaging array controller generates the first and second switch control signals and receives the pixel value.

In another aspect of the invention, the imaging controller generates a reset frame pixel value corresponding to one of the pixel sensors, the reset frame pixel value includes the difference of the first and second sample and hold voltages. The first sample and hold voltage corresponds to the floating diffusion node which is connected to the first reset source. The second sample and hold voltage corresponds to the floating diffusion node being disconnected from the first reset source after it is connected to the first reset source, but before charge has been transferred to the floating diffusion node after it is connected to the first reset source.

In one aspect of the invention the imaging controller generates a data frame pixel value for the one of the pixel sensors, the data frame pixel value includes the difference of the first and second sample and hold voltages, the first sample and hold voltage corresponding to the floating diffusion node after charge has been transferred to the floating diffusion node from the photodiode in the one of the pixel sensors and the second sample and hold voltage corresponding to the floating diffusion node which is connected to the first reset source after the first sample and hold voltage was generated.

In another aspect of the invention, the image controller generates a corrected data frame pixel value from the reset frame pixel value and the data frame pixel by forming a difference of the data frame pixel value and the reset frame pixel value.

DETAILED DESCRIPTION

Figure 1:
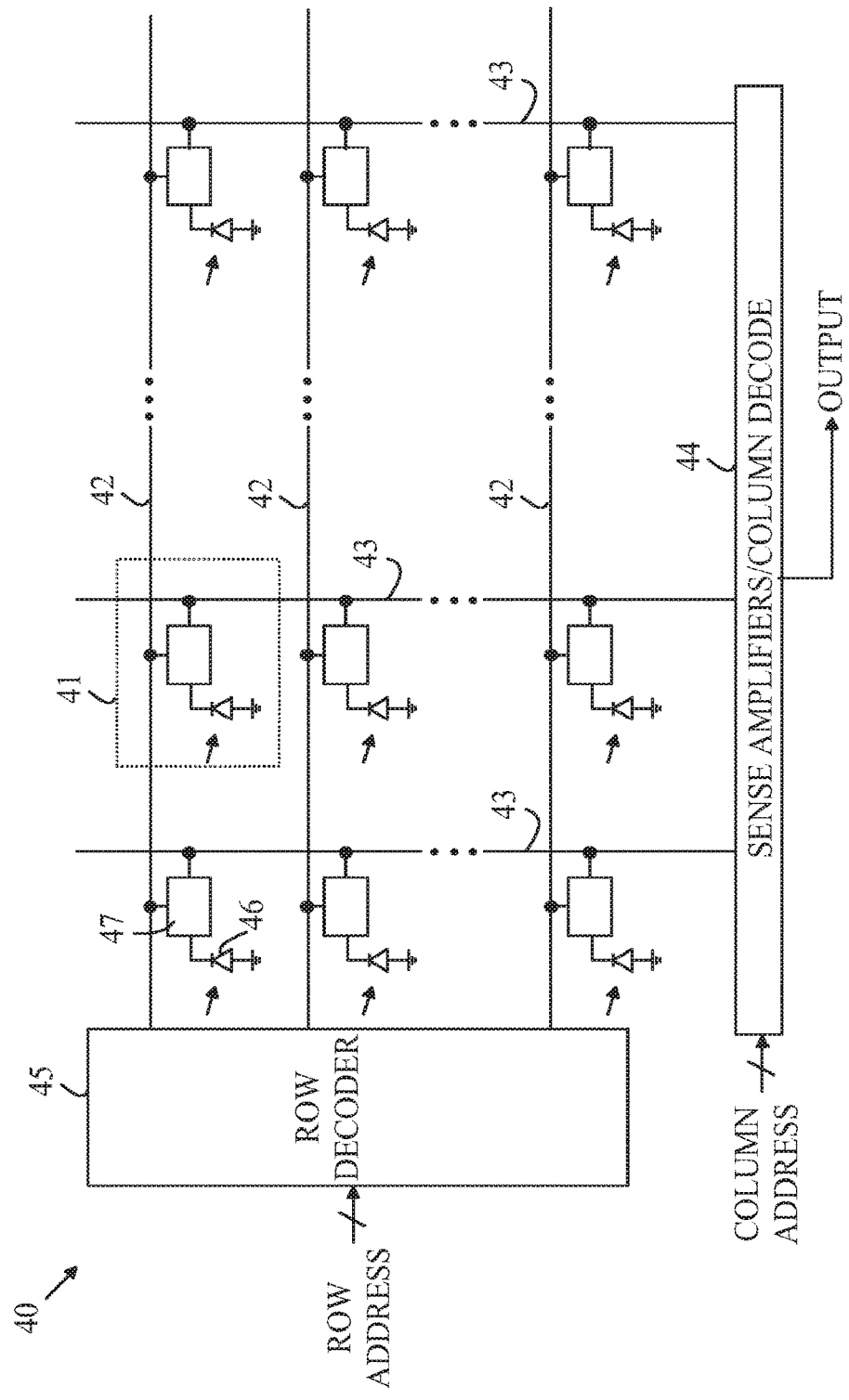
FIG. 1 is a schematic drawing of a prior art CMOS imaging array.

The manner in which the present invention achieves its advantages can be more easily understood with respect to the general organization of a CMOS imaging array and a typical prior art pixel sensor that is utilized in such arrays. Refer now to FIG. 1, which is a schematic drawing of a prior art CMOS imaging array. Imaging array 40 is constructed from a rectangular array of pixel sensors 41. Each pixel sensor includes a photodiode 46 and an interface circuit 47. The details of the interface circuit depend on the particular pixel design. However, all of the pixel sensors include a gate that is connected to a line 42 that is used to connect that pixel sensor to a bit line 43. The specific row that is enabled at any tune is determined by a row address that is input to a row decoder 45. The row select lines are a parallel array of conductors that run horizontally in the metal layers over the substrate in which the photodiodes and interface circuitry are constructed.

The various bit lines terminate in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel sensor is readout from the imaging array. The specific column that is read out is determined by a column address that is utilized by a column decoder to connect the sense amplifier/ADC output from that column to circuitry that is external to the imaging array.

Figure 2:
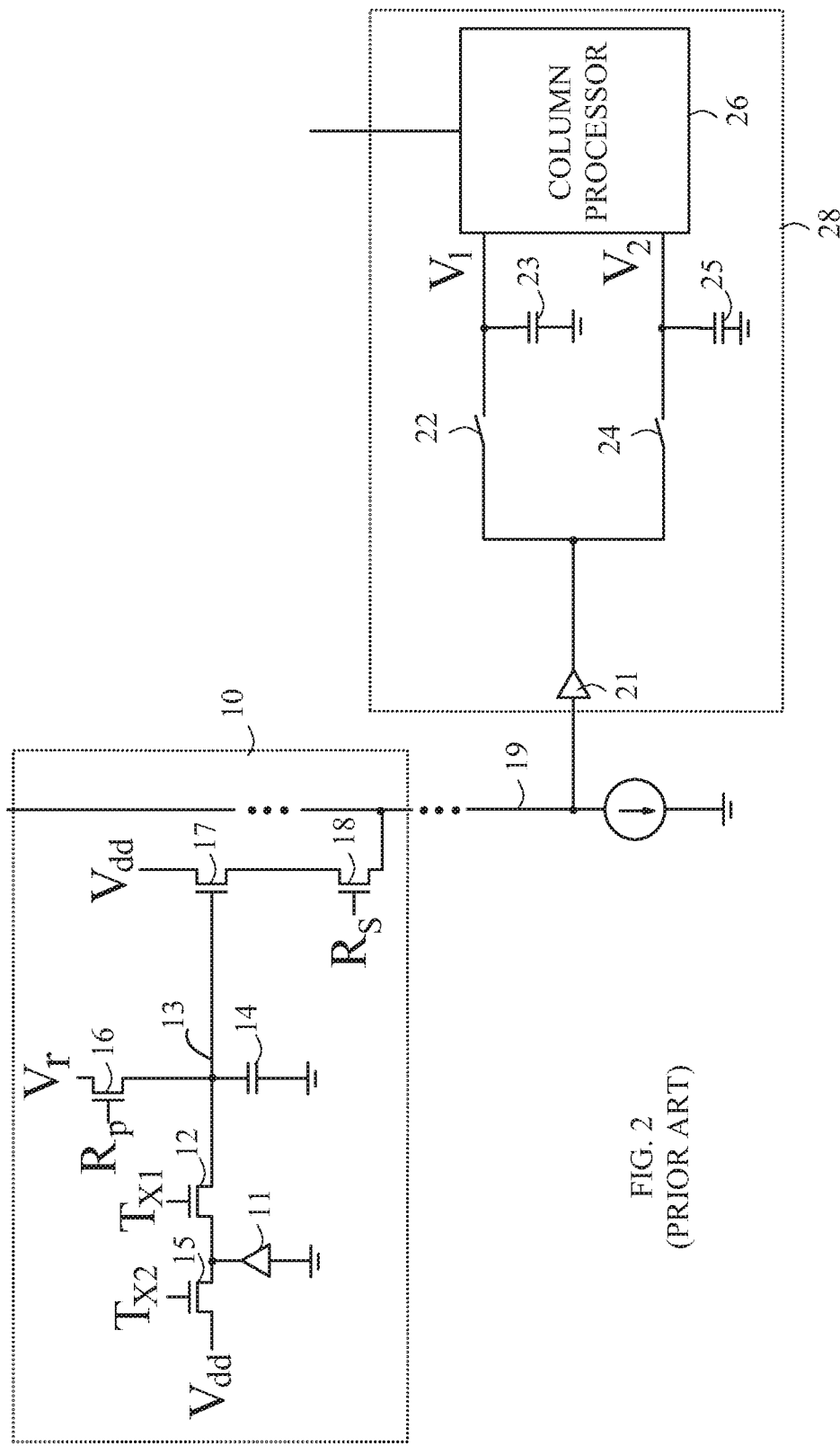
FIG. 2 illustrates a prior art pixel sensor of the type that can be used in the imaging array shown in FIG. 1 when that array is configured for a global shutter.

Refer now to FIG. 2, which illustrates a prior art pixel sensor of the type that can be used in the imaging array shown in FIG. 1 when that array is configured for a global shutter. Pixel 10 includes a photodiode 11 that collects the photocharge during an exposure. A transfer gate 12 allows the accumulated charge to be transferred from photodiode 11 to floating diffusion node 13 in response to signal $T_{x1}$. For the purposes of the present discussion, a floating diffusion node is defined to be an electrical node that is not tied to a power rail, or driven by another circuit. Floating diffusion node 13 is characterized by a parasitic capacitor 14 having a capacitance, $C_{FD}$. The collected charge alters the voltage of floating diffusion node 13 when the charge is transferred from photodiode 11 to floating diffusion node 13. An optional transfer gate 15 that is controlled by a signal $T_{x2}$ is used for anti-blooming protection by removing excess charge from photodiode 11 once photodiode 11 is saturated.

A reset gate 16 is used to set the voltage on floating diffusion node 13 prior to the charge being transferred, or to reset photodiode 11 prior to an exposure. The voltage on floating diffusion node 13 is amplified by a source follower transistor 17. When pixel 10 is to be readout, a signal on gate transistor 18 connects the output of source follower transistor 17 to a hit line 19 that is shared by all of the pixel sensors in a given column. For the purposes of the present discussion, a bit line is defined to be a conductor that is shared by a plurality of columns of pixel sensors and carries a voltage signal indicative of the voltage at the floating diffusion node in a pixel sensor that is connected to the bit line through a transfer gate.

Each bit line terminates in a column processing circuit 28. Column processing circuit 28 includes an optional amplifier 21 and two sample and hold circuits whose functions will be described in more detail below. The first sample and hold circuit comprises switch 22 and capacitor 23, and the second sample and hold circuit comprises switch 24 and capacitor 25. The outputs of these sample and hold circuits are processed by a column processor 26 to provide the output value for the pixel sensor currently connected to bit line 19. The manner in which the sample and hold circuits are used will be discussed in more detail below.

In a global shutter scheme, the charge in each pixel sensor is transferred to the floating diffusion node in that pixel sensor at the same time the charge is transferred in all of the other pixel sensors in the array. The pixel sensors are then readout row by row. A number of different schemes are utilized to lower the readout noise. These include correlated double sampling and correlated quadruple sampling. For the purposes of the current discussion it is sufficient to note that all of these schemes involve loading all of the floating diffusion nodes at once and then reading the rows one at a time to determine the potential on the floating diffusion nodes. During the time between the reset of a floating diffusion node and the subsequent reading out of the row in which that floating diffusion node is located, the floating diffusion node integrates dark current that results from the parasitic photodiodes contained in the floating diffusion nodes. This dark current reduces the amount of charge that is stored on the floating diffusion node. In addition, charge stored on the floating diffusion nodes tunnels through the surrounding barriers and further reduces the charge on the floating diffusion node.

The present invention is based on the observation that the dark current also depends on the voltage on the floating diffusion node during the period of time in which the charge is stored on the floating diffusion node. In particular, charge lost through tunneling is an exponential function of the voltage on the floating diffusion node. The charge resulting from the integration of the dark current also depends on the voltage on the floating diffusion node. Hence, if the voltage on the floating diffusion node can be reduced, the rate of charge loss from the floating diffusion node can be substantially reduced. Accordingly, the present invention provides a mechanism for lowering the voltage of the floating diffusion node during the periods in which charge is stored on the floating diffusion node and the pixel sensor is not being accessed. These periods will be referred to as storage periods in the following discussion. In one exemplary embodiment, the present invention provides a circuit that reduces the voltage at the floating diffusion node in a manner that depends on a control voltage applied to a capacitor that is connected to the floating diffusion node. By switching the control voltage during the storage periods, a substantial decrease in the charge leaking of the storage node can be achieved.

Figure 3:
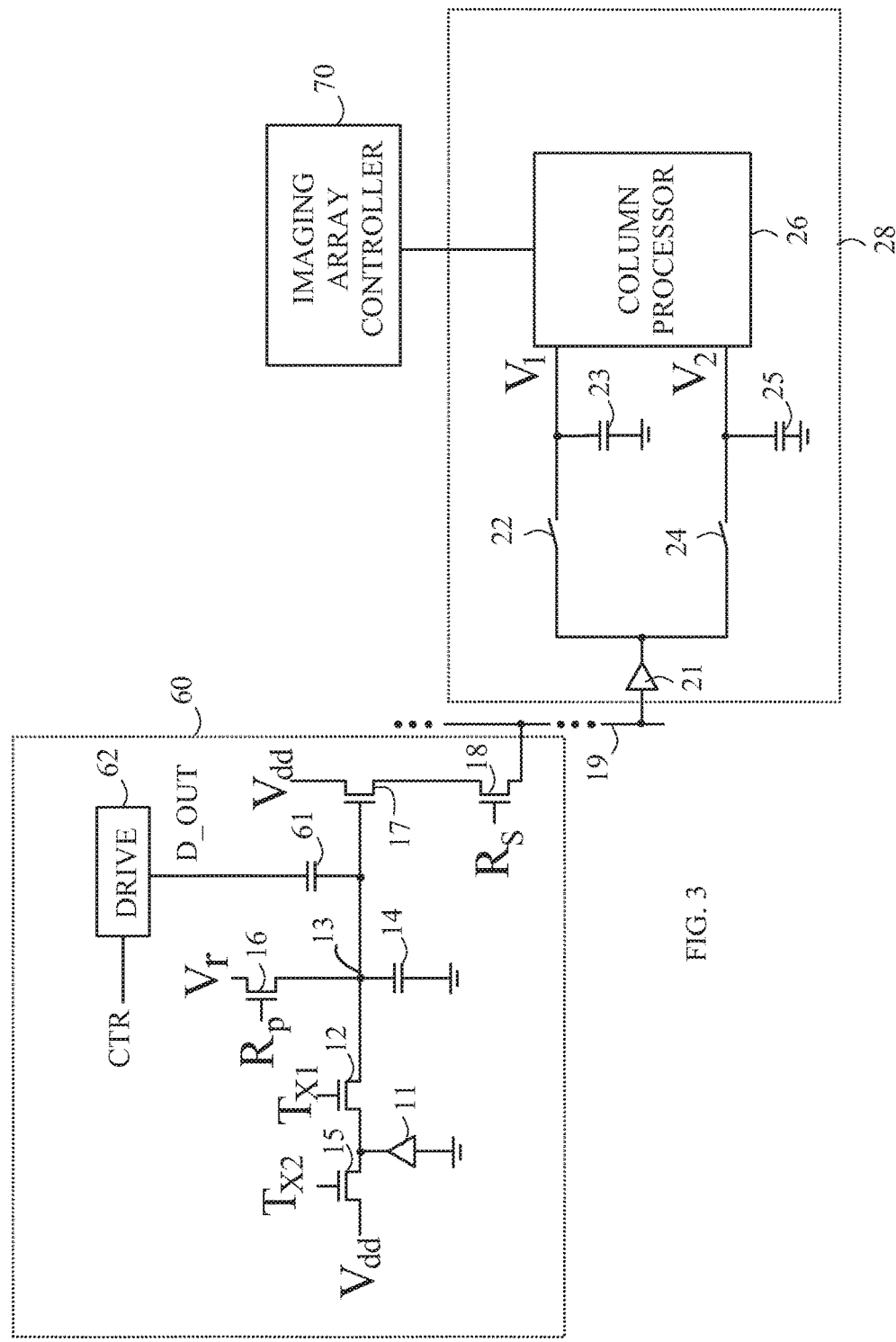
FIG. 3 illustrates a pixel sensor according to one embodiment of the present invention.

Refer now to FIG. 3, which illustrates a pixel sensor according to one embodiment of the present invention. Those elements of pixel sensor 60 that serve the same function as corresponding elements in pixel 10 have been given the same numeric designations to simplify the following discussion. The various control signals are generated by an array imaging controller 70, which also generates the final image. To simplify the drawings, the various control signal connections from array imaging controller 70 to the various gates and drive circuit 62 have been omitted from the drawings. Pixel sensor 60 includes a voltage dividing capacitor 61 that connects floating diffusion node 13 to a drive circuit 62 that sets the voltage on the lead of capacitor 61 that is not connected to floating diffusion node 13. When D_OUT is at ground, capacitor 61 is connected in parallel to capacitor 14 that characterizes floating diffusion node 13. In this configuration, the capacitance associated with floating diffusion node 13 is increased to the sum of the capacitances of capacitors 14 and 61. As a result, a portion of the charge that was stored on capacitor 14 moves to capacitor 61. Since floating diffusion node 13 is isolated during the storage periods, the voltage on floating diffusion node 13 is decreased by a factor equal to the ratio of the capacitance of capacitor 61, $C_{61}$, to the sum of the capacitances of floating diffusion node 13 and capacitor 61. The change in the voltage on the floating diffusion node when D_OUT is switched from $V_{D\_OUT}$ to ground, $\Delta V_{FD}$, is related to the voltage of D_OUT by $$\Delta V_{FD} = \frac{C_{61}}{C_{14} + C_{61}} V_{D\_OUT}$$

On the other hand, the sensitivity of the pixel sensor is decreased by increasing $C_{61}$. When D_OUT is returned to high, the portion of the charge from floating diffusion node 13 that moved to capacitor 61 when D_OUT went low returns to floating diffusion node 13.

In one aspect of the invention, the capacitance of capacitor 61 and the voltage of D_OUT when D_OUT is high is set such that the voltage on floating diffusion node 13 during the storage periods is less than 1.5 volts but greater than 0. The voltage on the floating diffusion node during the storage mode is a compromise between reducing the leakage from the floating diffusion node during the storage period, while still maintaining the voltage on floating diffusion node 13 at a value greater than 0 for all possible exposure values. In principle, capacitor 61 could be increased to further reduce the voltage during storage; however, increasing this capacitance value decreases the sensitivity of the pixel sensor the sensitivity of the pixel sensor depends on the charge to voltage conversion supplied by capacitor 14 and capacitor 61. If this capacitance is too high, the sensitivity is too low. In one exemplary embodiment, capacitor 61 has a capacitance that is less than one half of that of capacitor 14. In one exemplary embodiment, D_OUT is set to approximately twice $V_{dd}$.

Figure 4:
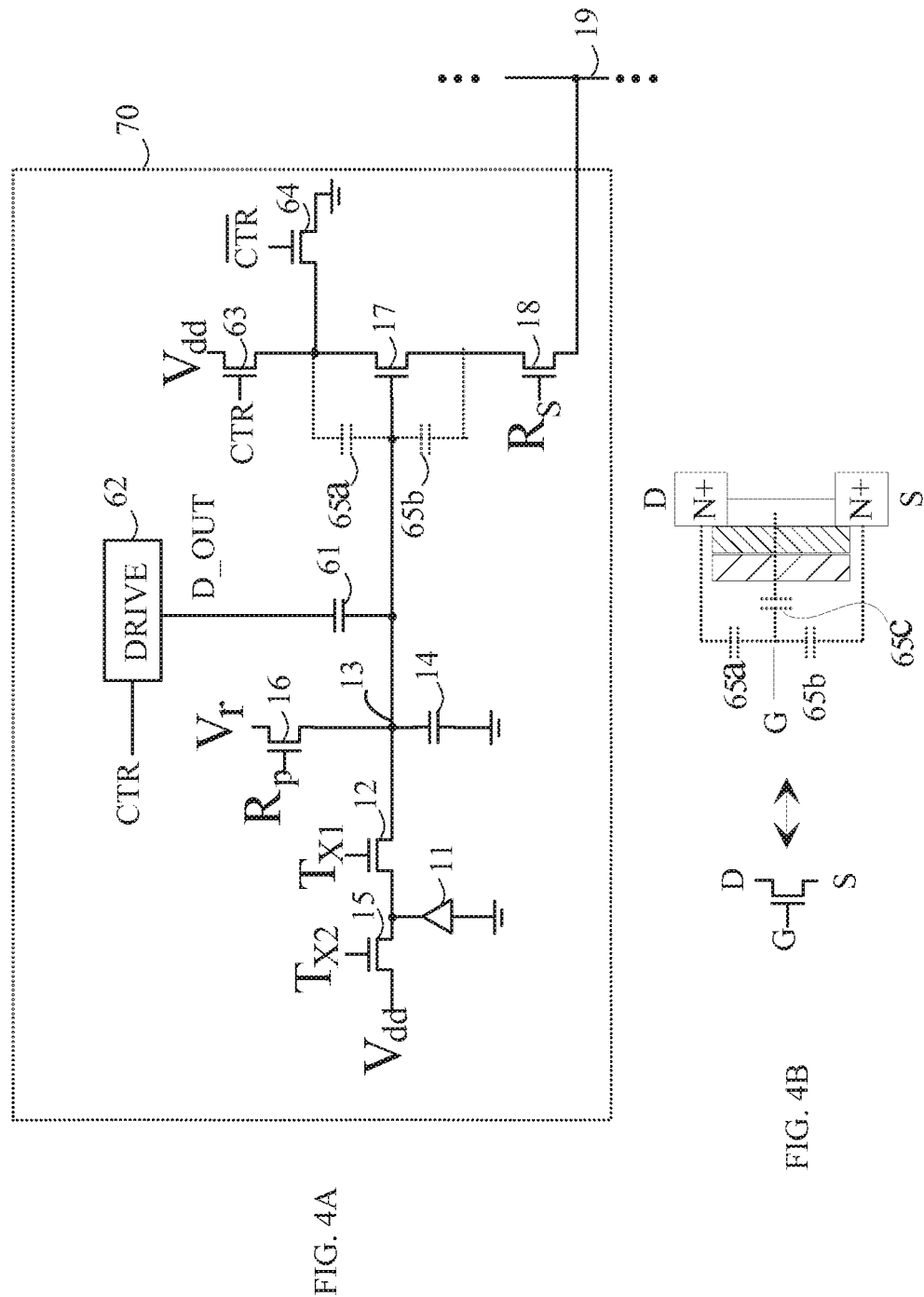
FIGS. 4A and 4B illustrate another embodiment of a pixel sensor according to the present invention.

If the size of the pixel sensor is large enough, then two additional small transistors can be used to provide an increased capacitance by using the source to gate capacitance of source follower transistor 17 in a manner analogous to that discussed above with respect to capacitor 61. Refer now to FIGS. 4A and 4B, which illustrate another embodiment of a pixel sensor according to the present invention. The additional gates are shown at 63 and 64. The additional transistors do not substantially increase the size of the pixel; hence, the added cost is minimal. As a result, the size of capacitor 61 can be reduced, or that capacitor can be eliminated. When D_OUT is high, capacitors 65a, 65b, and 65c are connected to a high voltage by gate 63. However, when D_OUT is at ground, gate 64 connects capacitors 65a, 65b and 65c to ground. Hence, gates 63 and 64 effectively switch capacitors 65a-c such that these capacitors are connected in parallel with capacitor 61, or in parallel with one another to the high voltage.

In one exemplary embodiment, $C_{14}$ is approximately 4 fF. As noted above, $C_{61}$ is approximately half the capacitance of $C_{14}$, i.e., 2 fF. The capacitance of $C_{65c}$ is typically the dominant capacitance for source follower transistor 17 and is approximately 1.5 fF in one exemplary embodiment. Hence, $C_{61}$ could be eliminated in that embodiment.

As noted above, the goal of the arrangement shown in FIGS. 3 and 4 is to reduce the voltage on floating diffusion node 13 during periods in which charge is stored on floating diffusion node 13 and is waiting to be readout via source follower transistor 17. Accordingly, D_OUT is set high when floating diffusion node 13 is being reset or being readout.

The present invention can be used advantageously in systems utilizing a global shutter in which the photodiodes in all of the pixel sensors in the array are reset at the start of an exposure and then the charge transferred to all of the floating diffusion nodes at the end of the exposure. The charge is then readout one row at a time. The need to transfer all of the charge at the same time while reading out the rows one at a time introduces a number of challenges in schemes that utilize multiple read operations on each pixel sensor to reduce noise in a global shutter imaging system. Ideally, the charge integrated during an exposure on each photodiode is read by first precharging capacitor 14 associated with floating diffusion node 13 to a voltage $V_r$ with gate 12 closed and then transferring the photocharge to floating diffusion node 13 by opening gate 12. The difference between $V_r$ and the voltage on floating diffusion node 13 after the charge is transferred is a measure of the average light intensity at the pixel corresponding to the photodiode during the exposure.

Figure 5:
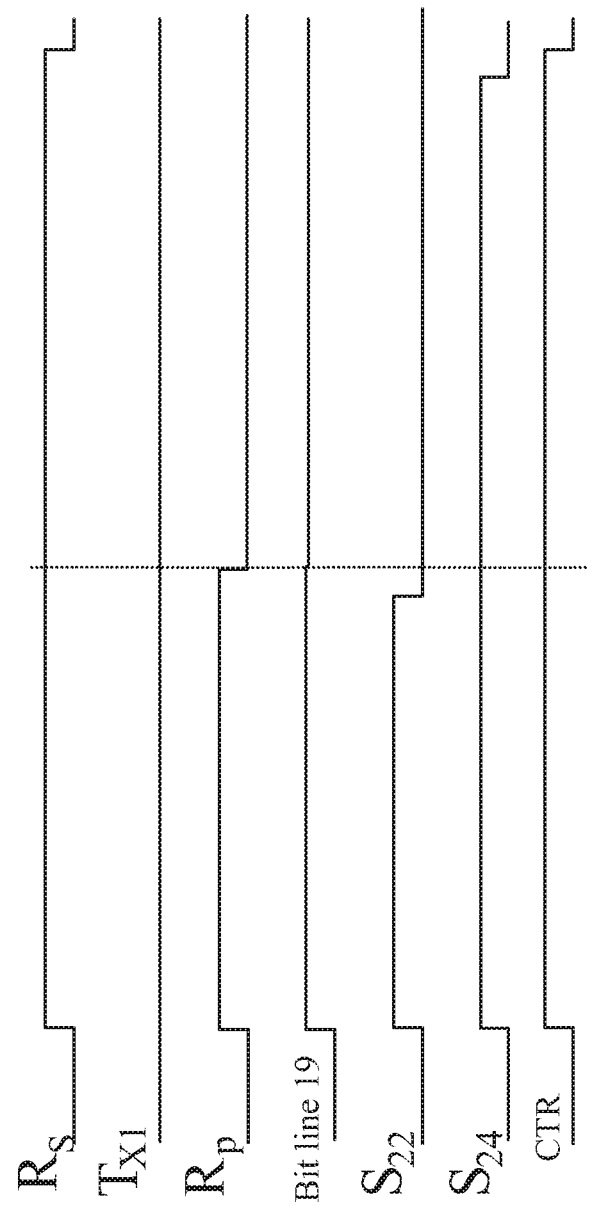
FIG. 5 illustrates the signal timings during a reset frame.

In one aspect of the present invention, the reset operations are performed in parallel with the exposure part of the image formation process. While the photocharge is accumulating in the photodiodes, the controller measures a reset frame. When the photocharge acquisition is complete, the photocharge is transferred to the floating diffusion nodes and an image frame is measured. The difference of the image frame and the reset frame is then used to generate the final image. Consider the portion of each pixel that consists of gate 15 and photodiode 11. To measure an exposure, the photodiodes are reset by opening gate 15 to connect the photodiodes to $V_{dd}$ and then gate 15 is closed, which starts the exposure. The exposure is terminated when gate 12 is opened to transfer the accumulated charge to floating diffusion node 13. During this exposure period, the readout circuitry is measuring the reset frame, Refer now to FIGS. 3 and 5. FIG. 5 illustrates the signal tunings during a reset frame. The signals $S_{22}$ and $S_{24}$ control switches 22 and 24 shown in FIG. 3. When these signals are high, the switches are conducting. When the drive control signal, CTR, is high, D_OUT is high. When CTR is low, D_OUT is connected to ground. A reset frame can be viewed as consisting of two periods. During the first period of the reset frame, floating diffusion node 13 is connected to $V_r$ by causing $R_p$ to go high. This, in turn, causes the potential on the bit line to rise to its highest value. During this first period, the voltage on bit line 19 is captured on capacitor 23 by closing switch 22. Then switch 22 is again opened. At the beginning of the second period, floating diffusion node 13 is disconnected from $V_r$ by causing $R_p$ to go low, and a small decrease in the voltage on floating diffusion node 13, and hence, bit line 19 occurs. This new voltage is captured on capacitor 25 by closing switch 24. The difference between the voltages captured on capacitors 23 and 25 is then computed and becomes the reset frame value for pixel sensor 60. As noted above, the reset frame is computed sequentially, one row at a time during the period in which the photodiodes are integrating light from the current exposure.

Figure 6:
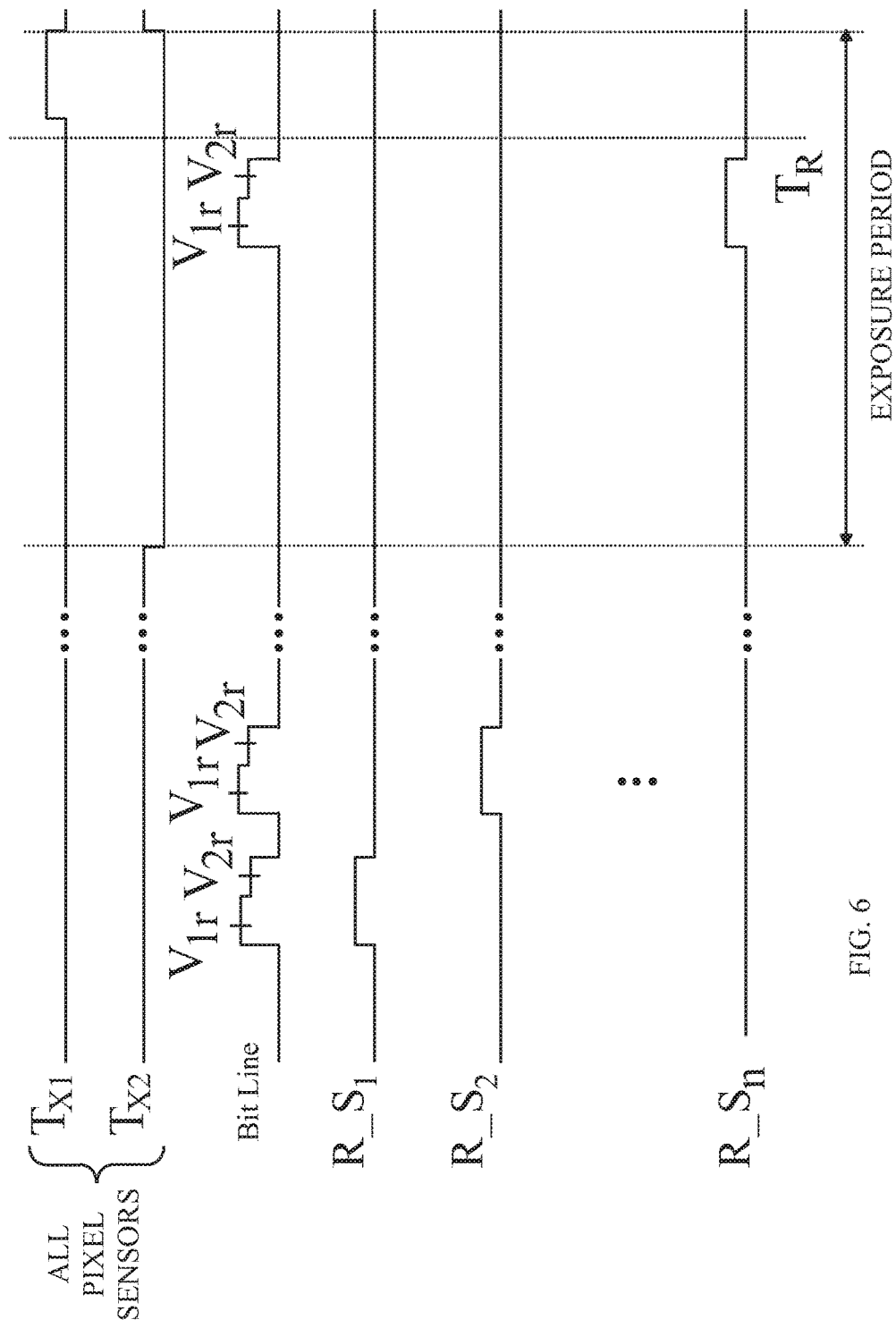
FIG. 6 illustrates the timing during the period in which the reset is being measured for the various pixel sensors in one row of the imaging array.

As noted above, the reference frame is measured while the photodiodes are integrating charge during the exposure period. Refer now to FIG. 6, which illustrates the timing during the period in which the reset is being measured for the various pixel sensors in one row of the imaging array. The control of the exposure is set by the signals $T_{x1}$ and $T_{x2}$ on gates 12 and 15. These signals are the same for all of the pixel sensors in the array. Initially, $T_{x1}$ is low, which isolates the photodiode in each pixel sensor from the floating diffusion node in that pixel sensor. $T_{x1}$ remains low until after the reset frame is acquired. $T_{x2}$ is initially high. In this state, the photodiode is connected to $V_{dd}$ and remains in a continually reset state until $T_{x2}$ goes low and isolates the photodiode. This starts the exposure period. The exposure period terminates after the charge accumulated on the photodiode is transferred to the floating diffusion node by taking $T_{x1}$ high and then low. The exposure period ends when $T_{x1}$ goes low.

All of the pixels in a given column are connected to the same bit line. As each row is connected in sequence to the bit line, the voltage on the bit line is sampled twice, once while the floating diffusion node is connected to $V_r$ and once after the floating diffusion node is disconnected from $V_r$ using gate 16. The measured voltages during these two periods are labeled as $V_{1r}$ and $V_{2r}$. The column processor measures these two voltages and computes the difference of the two voltages. The difference is the reset frame pixel value for the corresponding pixel sensor. At the end of the reset period, which is shown at $T_R$ in FIG. 6, all of the floating diffusion nodes in the pixel sensors will be at the reset voltage, $V_{2r}$, measured for that floating diffusion node during the reset frame period.

Figure 7:
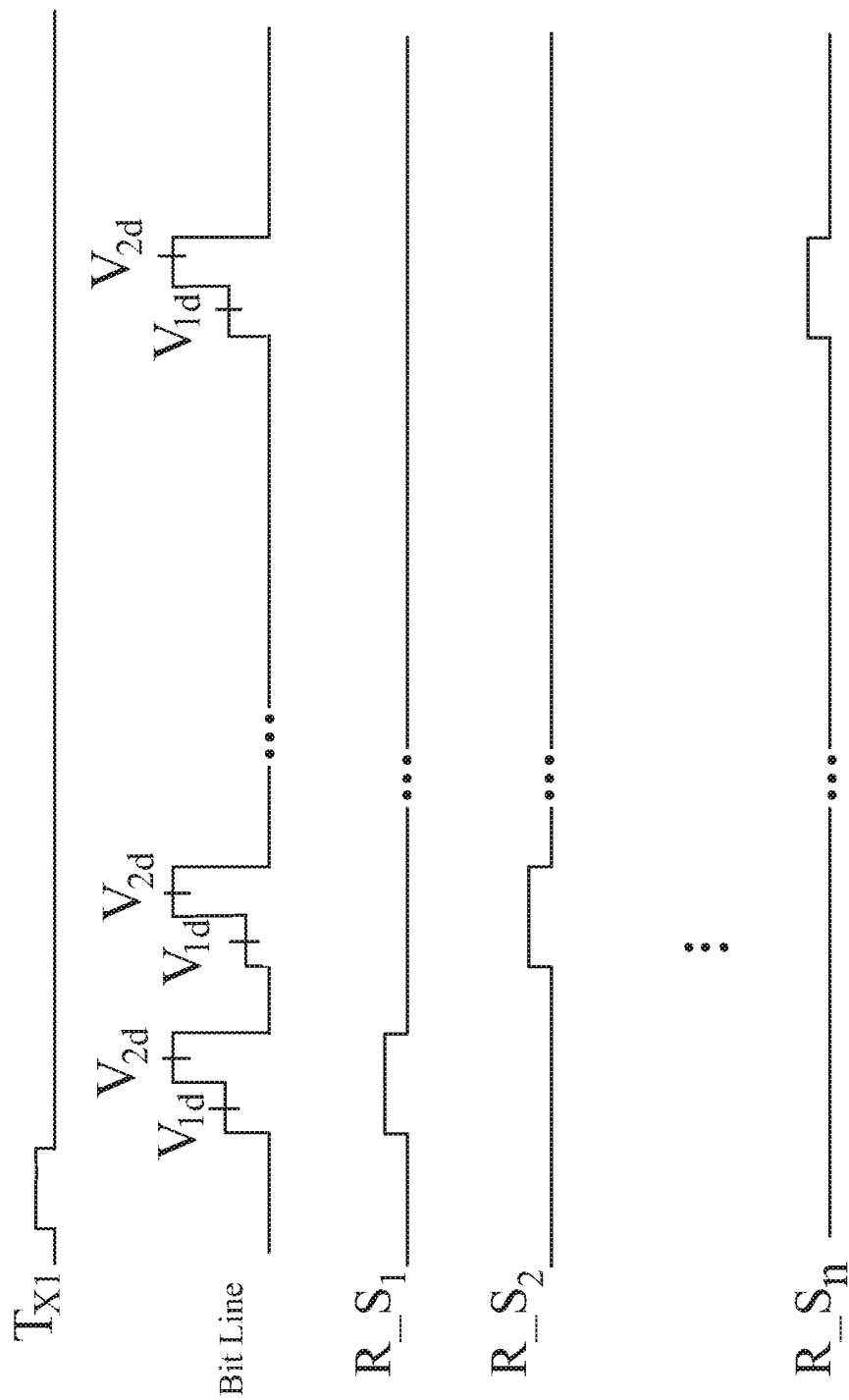
FIG. 7 illustrates a data frame readout from the point of view of a bit line.

At the beginning of the data frame readout, the floating diffusion node in each of the pixel sensors has a voltage determined by the $V_{2r}$ value at the end of the reset frame and the charge transferred from the photodiode in that pixel sensor. This begins the data frame readout portion of the image acquisition. Refer now to FIG. 7, which illustrates a data frame readout from the point of view of a bit line. The data frame readout begins when $T_{x1}$ goes low, thus isolating the floating diffusion nodes in the pixel sensors attached to the bit line in question. Each pixel in the column is selected in sequence as indicated by the row select signals, $R\_S_1$, $R\_S_2$, ... $R\_S_n$. When a row is selected, the voltage on the floating diffusion node in that row is measured to provide the data value $V_{1d}$ for that pixel sensor. The floating diffusion node is then connected at $V_r$ and the floating diffusion node voltage $V_{2d}$ is measured. The difference, $V_{2d}$-$V_{1d}$ is the pixel value for the pixel in the data frame corresponding to that pixel sensor.

As noted above, the voltage on a floating diffusion node decreases slightly when the floating diffusion node is isolated from the $V_r$ source after a reset. Hence, the value $V_{2d}$ does not accurately represent the floating diffusion node voltage after reset. The difference in floating diffusion node voltage after isolation following a reset is, however, stored in the pixel value in the reset frame. Hence, subtracting the reset frame from the data frame pixel by pixel corrects for this difference.

The above analysis ignores the dark current in each pixel. The value of $V_{2r}$ at the floating diffusion node when the charge is transferred is reduced by the integrated dark current since the reset of the floating diffusion node. Hence, when the charge is transferred, the voltage on the floating diffusion node will indicate a charge transfer that was greater than the actual charge transferred from the photodiode. The present invention reduces this dark current during the times the floating diffusion node is not being accessed, which are referred to as the storage periods, and hence, substantially reduces this source of error.

Figure 8:
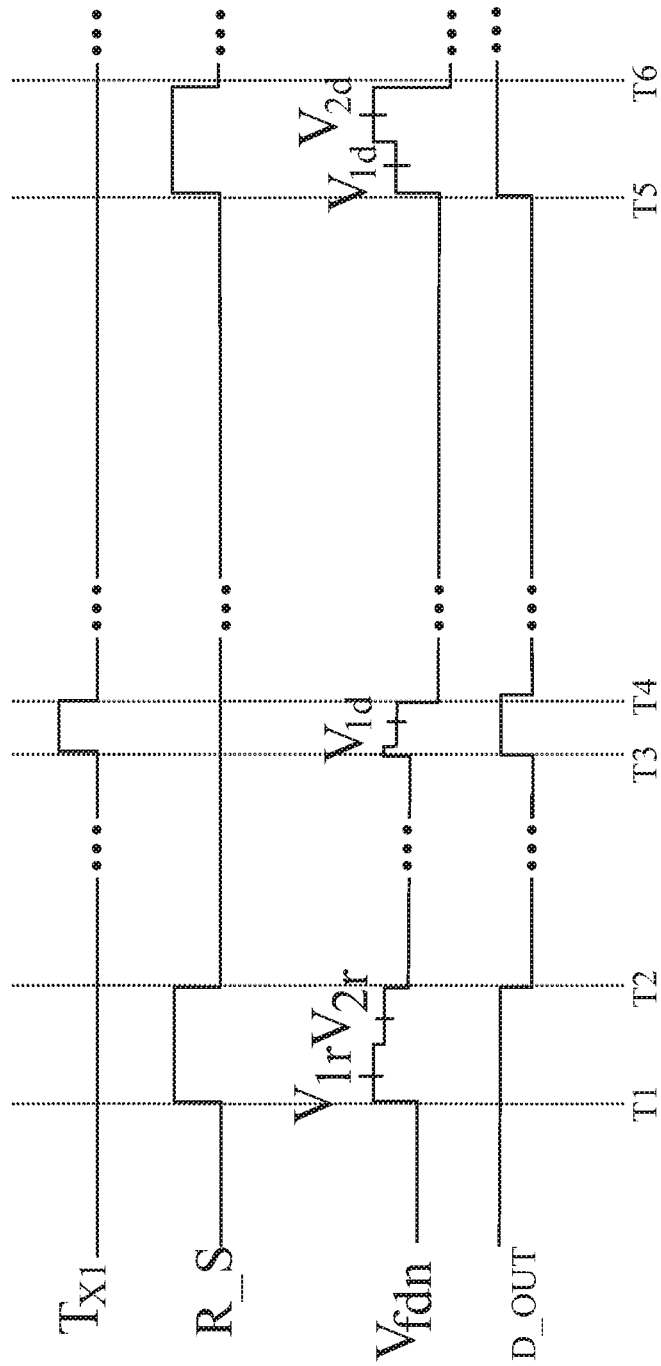
FIG. 8 illustrates the voltages on a floating diffusion node, $V_{fdn}$, at various points in a frame.

Refer now to FIG. 8, which illustrates the voltages on a floating diffusion node, $V_{fdn}$, at various points in a frame. The pixels in the row of the pixel in question are selected for readout during the measurement of the reset frame and during the measurement of the data frame. Prior to being selected for reset, (he voltage on the floating diffusion node is at a value determined by the last reset during the previous data frame readout less any loss of voltage due to dark current integration. This voltage is irrelevant, since the floating diffusion node will be reset to $y_r$ as soon as the row is selected by R_S going high; however, in this example, D_OUT is set to ground. When the pixel is selected, as shown at T1, D_OUT goes high so that the measurements of the voltages on the floating diffusion node during and after reset can be made. At the end of the reset frame measurement, T2, the floating diffusion node goes into a storage period until just before the charge accumulated on the photodiode during the exposure is transferred to the floating diffusion node.

At the start of this storage period, the voltage on the floating diffusion node is near that of the reset voltage, and hence, high enough to activate the parasitic photodiode in the floating diffusion node to integrate any dark current. Hence, D_OUT is lowered to ground, which reduces the voltage on the floating diffusion node to a value below the voltage that would allow the parasitic photodiode to integrate dark current. In one exemplary embodiment, this voltage is less than 1.5 volts. At the end of the storage period, T3, D_OUT again goes high, and the voltage on the floating diffusion node returns to $V_{2r}$.

The integrated charge from the photodiode is then transferred to floating diffusion node by pulsing $T_{x1}$. At the end of this pulse, shown at T4, the voltage on the floating diffusion node is reduced to a value indicative of the amount of charge accumulated during the exposure period, i.e., $V_{1d}$. The floating diffusion node then enters another storage period during which D_OUT is again set to ground to maintain the voltage on the floating diffusion node at a value below 1.5V. At the end of this storage period, shown at T5, D_OUT again goes high and the voltage on the floating diffusion node is returned to $V_{1d}$ when the pixel sensor is selected for reading. After the values of $V_{1d}$ and $V_{2d}$ have been recorded, as shown at T6, the readout of the pixel sensor is complete.

In the above-described embodiments transfer gate 15 is used to prevent blooming and to reset the photodiode. In principle, an imaging array in which the pixels lack transfer gate 15 can be constructed and still function in a global shutter mode. In such a system, the photodiode would be reset by connecting to $V_r$ through gate 16. The reset frame would then be computed during the exposure time as described above. Such an embodiment assumes that there is sufficient time to generate the reset frame during the image exposure. For short exposures, this may not be possible. In addition, such embodiments are not preferred because of blooming problems in pixels exposed to high light intensities. In such pixels, the photodiode can saturate, and the excess charge can leak out to contaminate nearby pixels. Gate 15 will pass the excess charge to the power rail if the voltage on the photodiode is too low, and hence, prevents such blooming.

The above embodiments utilize a source follower transistor in each pixel sensor to generate a voltage on the bit line that is a linear function of the voltage on the floating diffusion node. However, embodiments in which this buffering function is accomplished with some other form of amplifier that provides a voltage on the bit line that is a monotonic function of the voltage on the floating diffusion node can also be utilized. Accordingly, the term amplifier will defined to include both source followers and other forms of amplifier within a pixel sensor.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising a plurality of pixel sensors connected to a bit line, each pixel sensor comprising a first photodetector comprising:
   a photodiode;
   a floating diffusion node characterized by a parasitic photodiode and parasitic capacitance;
   an amplifier that amplifies a voltage on said floating diffusion node to produce a signal on an amplifier output;
   a bit line gate that connects said amplifier output to said bit line in response to a row select signal;
   a voltage dividing capacitor having a first terminal connected to said floating diffusion node and a second terminal connected to a drive source that switches a voltage on said second terminal between a drive potential different from ground and ground in response to a drive control signal;
   a reset gate that connects said floating diffusion node to a first reset voltage source in response to a reset signal; and
   a first transfer gate that connects said photodiode to said floating diffusion node in response to a first transfer signal.

2. The apparatus of claim 1 wherein each pixel sensor further comprises a second transfer gate that connects said photodiode to a second reset source in response to a second transfer signal.

3. The apparatus of claim 1 wherein said amplifier comprises a source follower having a gate connected to said floating diffusion node.

4. The apparatus of claim 3 wherein said source follower is characterized by a drain terminal and wherein said apparatus further comprises a switching circuit that switches said drain terminal from a power rail to ground when said second terminal of said drive voltage dividing capacitor is at ground.

5. The apparatus of claim 1 further comprising an imaging array controller that generates said row select signal, said drive control signal, said reset signal, and said first transfer gate signal.

6. The apparatus of claim 5 wherein said imaging array controller generates said drive control signal such that said second terminal is at ground and said amplifier output is not connected to said bit line in response to said row select signal.

7. The apparatus of claim 6 wherein said imaging array controller generates said drive control signal such that said second terminal is at said drive potential when said reset signal causes said floating diffusion node to be connected to said first reset voltage source.

8. The apparatus of claim 6 wherein said imaging array controller generates said drive control signal such that said second terminal is at said drive potential when said first transfer signal causes said floating diffusion node to be connected to said photodiode.

9. The apparatus of claim 5 further comprising a column processing circuit connected to said bit line, said column processing circuit comprising:
   a first switch that connects said bit line to a first sample and hold capacitor in response to a first switch control signal to generate a first sample and hold voltage;
   a second switch that connects said bit line to a second sample and hold capacitor in response to a second switch control signal to generate a second sample and hold voltage; and a column processor that generates a pixel value comprising a difference of said first and second sample and hold voltages, said imaging array controller generating said first and second switch control signals and receiving said pixel value.

10. The apparatus of claim 9 wherein said imaging array controller generates a reset frame pixel value corresponding to one of said pixel sensors, said reset frame pixel value comprising said difference of said first and second sample and hold voltages, said first sample and hold voltage corresponding to said floating diffusion node being connected to said first reset source and said second sample and hold voltage corresponding to said floating diffusion node being disconnected from said first reset source after being connected to said first reset source, but before charge has been transferred to said floating diffusion node after being connected to said first reset voltage source.

11. The apparatus of claim 10 wherein said imaging array controller generates a data frame pixel value for said one of said pixel sensors, said data frame pixel value comprising said difference of said first and second sample and hold voltages, said first sample and hold voltage corresponding to said floating diffusion node after charge has been transferred to said floating diffusion node from said photodiode in said one of said pixel sensors and said second sample and hold voltage corresponding to said floating diffusion node being connected to said first reset source after said first sample and hold voltage was generated.

12. The apparatus of claim 11 wherein said imaging array controller generates a corrected data frame pixel value from said reset frame pixel value and said data frame pixel value by forming a difference of said data frame pixel value and said reset frame pixel value.

* * * * *